United States Patent
Yu et al.

(10) Patent No.: US 11,265,131 B2
(45) Date of Patent: *Mar. 1, 2022

(54) CONTROL INFORMATION SENDING METHOD AND CONTROL INFORMATION RECEIVING METHOD, AND APPARATUS

(71) Applicant: HUAWEI TECHNOLOGIES CO.,LTD., Guangdong (CN)

(72) Inventors: Zheng Yu, Beijing (CN); Jinhuan Xia, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

This patent is subject to a terminal disclaimer.

(21) Appl. No.: 16/838,917

(22) Filed: Apr. 2, 2020

(65) Prior Publication Data

US 2020/0235888 A1  Jul. 23, 2020

Related U.S. Application Data

(63) Continuation of application No. 16/382,345, filed on Apr. 12, 2019, now Pat. No. 10,623,165, which is a
(Continued)

(51) Int. Cl.
*H04L 5/00* (2006.01)
*H04W 76/27* (2018.01)
*H04W 72/04* (2009.01)

(52) U.S. Cl.
CPC ......... *H04L 5/0053* (2013.01); *H04W 72/042* (2013.01); *H04W 76/27* (2018.02); *H04W 72/0406* (2013.01)

(58) Field of Classification Search
CPC ............ H04L 5/0053; H04W 72/0406; H04W 72/042; H04W 76/046; H04W 72/04;
(Continued)

(56) References Cited

U.S. PATENT DOCUMENTS 9,673,947 B2   6/2017  Wu et al.
2012/0063401 A1*  3/2012  Xue ................... H04L 5/0037
370/329
(Continued)

FOREIGN PATENT DOCUMENTS

CN   101882980 A   11/2010
CN   102202400 A    9/2011
(Continued)

OTHER PUBLICATIONS

3GPP TS 36.211 V11.2.0 (Feb. 2013),3rd Generation Partnership Project;Technical Specification Group Radio Access Network,Evolved Universal Terrestrial Radio Access (E-UTRA);Physical Channels and Modulation(Release 11),total 109 pages.
(Continued)

*Primary Examiner* — Robert J Lopata
(74) *Attorney, Agent, or Firm* — Gregg Jansen

(57) ABSTRACT

The present application discloses a control information sending method that includes: determining, by the user equipment, a first pattern from a preset set of patterns, wherein the pattern corresponds to an aggregation level for control information in each subframe of multiple subframes, and/or a resource indicator for a resource that is used for the control information in each subframe of the multiple subframes; and acquiring, by the user equipment, the control information mapped on the resource in each subframe of the multiple subframes according to the first pattern.

16 Claims, 4 Drawing Sheets

Determine, from a preset set of patterns, a pattern as a first pattern —101

Determine, according to the first pattern, a resource that is used for transmitting, in each subframe of multiple subframes, control information, and map the control information to the resource that is used for transmitting, in each subframe of the multiple subframes, the control information —102

Send the mapped control information by using a physical channel —103

Related U.S. Application Data continuation of application No. 14/981,487, filed on Dec. 28, 2015, now Pat. No. 10,284,348, which is a continuation of application No. PCT/CN2013/078397, filed on Jun. 28, 2013.

(58) Field of Classification Search
CPC .... H04W 72/12; H04W 76/00; H04B 7/2121; H04B 7/2123
USPC ......................................................... 370/329
See application file for complete search history.

(56) References Cited

U.S. PATENT DOCUMENTS

| | | | |
|---|---|---|---|
| 2012/0082022 A1* | 4/2012 | Damnjanovic | H04W 24/10 370/201 |
| 2012/0134332 A1* | 5/2012 | Lin | H04B 7/0678 370/329 |
| 2012/0170444 A1* | 7/2012 | Ogawa | H04J 13/18 370/209 |
| 2012/0320838 A1* | 12/2012 | Yang | H04L 1/0061 370/329 |
| 2013/0135988 A1* | 5/2013 | Kim | H04L 1/1887 370/216 |
| 2013/0155996 A1 | 6/2013 | Horiuchi et al. | |
| 2013/0188569 A1* | 7/2013 | He | H04L 5/0007 370/329 |
| 2013/0279481 A1* | 10/2013 | Horiuchi | H04W 72/0406 370/336 |
| 2014/0071934 A1* | 3/2014 | Frenne | H04L 5/0053 370/330 |
| 2014/0098775 A1* | 4/2014 | Horiuchi | H04W 72/0453 370/329 |
| 2014/0098780 A1* | 4/2014 | Kim | H04L 5/0055 370/329 |
| 2014/0133365 A1* | 5/2014 | Peng | H04L 5/0092 370/278 |
| 2014/0140310 A1 | 5/2014 | Liu et al. | |
| 2014/0146775 A1* | 5/2014 | Guan | H04L 5/0053 370/329 |
| 2014/0177547 A1 | 6/2014 | Guo et al. | |
| 2014/0376457 A1* | 12/2014 | Feng | H04L 5/001 370/329 |
| 2015/0009937 A1* | 1/2015 | Li | H04W 72/042 370/329 |
| 2015/0117354 A1* | 4/2015 | Dai | H04L 5/0053 370/329 |
| 2015/0146672 A1* | 5/2015 | Wu | H04L 5/0053 370/329 |
| 2015/0237624 A1* | 8/2015 | Tang | H04W 48/16 370/329 |
| 2016/0174194 A1* | 6/2016 | Suzuki | H04L 5/0053 370/312 |
| 2016/0365960 A1 | 12/2016 | Liu et al. | |
| 2017/0290010 A1* | 10/2017 | Tang | H04W 72/0446 |

FOREIGN PATENT DOCUMENTS

| | | |
|---|---|---|
| CN | 102368759 A | 3/2012 |
| CN | 102724757 A | 10/2012 |
| CN | 102905379 A | 1/2013 |
| CN | 103004274 A | 3/2013 |
| WO | 2011143480 A1 | 11/2011 |
| WO | 2012061224 A1 | 5/2012 |
| WO | 2013013643 A1 | 1/2013 |

OTHER PUBLICATIONS

3GPP TS 36.213 V11.2.0 (Feb. 2013),3rd Generation Partnership Project;Technical Specification Group Radio Access Network,Evolved Universal Terrestrial Radio Access (E-UTRA);Physical layer procedures(Release 11),total 173 pages.

3GPP TS 36.321 V11.2.0 (Mar. 2013),3rd Generation Partnership Project;Technical Specification Group Radio Access Network,Evolved Universal Terrestrial Radio Access (E-UTRA);Medium Access Control (MAC) protocol specification(Release 11),total 56 pages.

3GPP TS 36.331 V11.3.0 (Mar. 2013),3rd Generation Partnership Project;Technical Specification Group Radio Access Network,Evolved Universal Terrestrial Radio Access (E-UTRA);Radio Resource Control (RRC);Protocol specification(Release 11),total 344 pages.

3GPP TS 36.101 V11.4.0 (Mar. 2013);3rd Generation Partnership Project;Technical Specification Group Radio Access Network;Evolved Universal Terrestrial Radio Access (E-UTRA);User Equipment (UE) radio transmission and reception(Release 11);total 402 pages.

3GPP TS 36.212 V11.3.0 (Jun. 2013);3rd Generation Partnership Project;Technical Specification Group Radio Access Network;Evolved Universal Terrestrial Radio Access (E-UTRA);Multiplexing and channel coding(Release 11);total 84 pages.

3GPP TS 36.300 V11.5.0 (Mar. 2013);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11);total 209 pages.

3GPP TS 36.304 V11.3.0 (Mar. 2013);3rd Generation Partnership Project;Technical Specification Group Radio Access Network;Evolved Universal Terrestrial Radio Access (E-UTRA); User Equipment (UE) procedures in idle mode(Release 11);total 34 pages.

3GPP TS 36.355 V11.2.0 (Mar. 2013);3rd Generation Partnership Project;Technical Specification Group Radio Access Network;Evolved Universal Terrestrial Radio Access (E-UTRA);LTE Positioning Protocol (LPP)(Release 11);total 119 pages.

3GPP TS 36.413 V11.4.0 (Jun. 2013);3rd Generation Partnership Project;Technical Specification Group Radio Access Network;Evolved Universal Terrestrial Radio Access Network(E-UTRAN);S1 Application Protocol (S1AP)(Release 11);total 274 pages.

* cited by examiner

CONTROL INFORMATION SENDING METHOD AND CONTROL INFORMATION RECEIVING METHOD, AND APPARATUS

CROSS-REFERENCE TO RELATED APPLICATIONS

This application is a continuation of U.S. patent application Ser. No. 16/382,345, filed on Apr. 12, 2019, which is a continuation of U.S. patent application Ser. No. 14/981,487, filed on Dec. 28, 2015, now U.S. Pat. No. 10,284,348, which is a continuation of International Patent Application No. PCT/CN2013/078397, filed on Jun. 28, 2013. All of the afore-mentioned patent applications are hereby incorporated by reference in their entireties.

TECHNICAL FIELD

The present application relates to the communications field, and in particular, to a control information sending method, a control information receiving method, and an apparatus thereof.

BACKGROUND

A Long Term Evolution (LTE) project evolves from 3G. The LTE project improves and enhances an over-the-air access technology of 3G, and improves performance of a cell-edge user. In an LTE system, reliability of information transmission is one of issues that an operator cares about, where reliable transmission of control information is a premise of normal communication.

In the prior art, a control information transmission method is provided, which is specifically: performing, in an LTE system, transmission of control information by using a physical downlink control channel (PDCCH). When a base station needs to send control information to UE, the base station first determines an aggregation level that is used for transmitting the control information, determines, from candidate PDCCHs included in search space corresponding to the aggregation level, a candidate PDCCH as a PDCCH carrying the control information, and sends the control information to the UE in a downlink subframe by using the PDCCH. The UE blindly detects, in the downlink subframe and in search space corresponding to each aggregation level, the PDCCH. When determining the PDCCH that the base station provides for the UE, the UE acquires the control information.

Since a base station can perform mapping and transmission of the control information in only one downlink subframe, reliability of control information transmission is relatively low.

SUMMARY

To improve reliability of control information transmission, embodiments of the disclosure provide a control information transmission method and an apparatus. The technical solutions are as follows:

A control information sending method is provided, where the method includes:
  determining, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information;
  determining, according to the first pattern, a resource that is used for transmitting, in each subframe of the multiple subframes, the control information, and mapping the control information to the resource that is used for transmitting, in each subframe of the multiple subframes, the control information; and sending the mapped control information by using a physical channel.

The aggregation level indicates a quantity of control elements or a quantity of physical resource blocks that are used for transmitting the control information.

The resource indicator for the used resource is a location indicator indicating a location, in all resources that can be provided by a single subframe, of a start resource in the used resource, a location indicator indicating a location, in all resources that are in a single subframe and that can be processed by user equipment, of a start resource in the used resource, a location indicator indicating a location, in all resources that are at an aggregation level in a single subframe and that can be processed by user equipment, of a start resource in the used resource, a location indicator indicating a location, in all resources that can be provided by a single subframe, of the used resource, a location indicator indicating a location, in all resources that are in a single subframe and that can be processed by user equipment, of the used resource, an index of a candidate physical control channel in all candidate physical control channels that are provided by search space corresponding to an aggregation level in a single subframe, an index, in all resources that can be provided by a single subframe, of the used resource, or an index, in all resources that are in a single subframe and that can be processed by user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

A control information receiving method is provided, where the method includes:
  determining, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information; and
  acquiring, according to the first pattern, the control information on a resource, to which the control information is mapped, in each subframe of the multiple subframes.

A base station is provided, where the base station includes:
  a determining unit, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information;

a mapping unit, configured to: determine, according to the first pattern determined by the determining unit, a resource that is used for transmitting, in each subframe of the multiple subframes, the control information, and map the control information to the resource that is used for transmitting, in each subframe of the multiple subframes, the control information; and a sending unit, configured to send, by using a physical channel, the control information mapped by the mapping unit.

User equipment (UE) is provided, where the UE includes:

a determining unit, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information; and an acquisition unit, configured to acquire, according to the first pattern determined by the determining unit, the control information on a resource, to which the control information is mapped, in each subframe of the multiple subframes.

A base station is provided, where the base station includes:

a processor, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information, where the processor is further configured to: determine, according to the first pattern, a resource that is used for transmitting, in each subframe of the multiple subframes, the control information, and map the control information to the resource that is used for transmitting, in each subframe of the multiple subframes, the control information; and a transmitter, configured to send, by using a physical channel, the control information mapped by the processor.

User equipment (UE) is provided, where the UE includes:

a processor, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information, where the processor is further configured to acquire, according to the first pattern, the control information on a resource, to which the control information is mapped, in each subframe of the multiple subframes.

In the embodiments of the disclosure, a pattern is determined, from a preset set of patterns, as a first pattern, where the preset set of patterns includes one or more patterns. The pattern determines an aggregation level that is used for transmitting, in each subframe of multiple subframes, control information and/or determines a resource indicator for a resource that is used for transmitting, in each subframe of the multiple subframes, the control information. A resource that is used for transmitting, in each subframe of the multiple subframes, the control information is determined according to the first pattern. The control information is mapped to the resource that is used for transmitting, in each subframe of the multiple subframes, the control information, and the mapped control information is sent by using a physical channel. In this way, the control information is mapped and transmitted in the multiple subframes, and reliability of control information transmission is improved.

DESCRIPTION OF EMBODIMENTS

To make the objectives, technical solutions, and advantages of the present application clearer, the following further describes the embodiments of the disclosure in detail with reference to the accompanying drawings.

Embodiment 1

Figure 1:
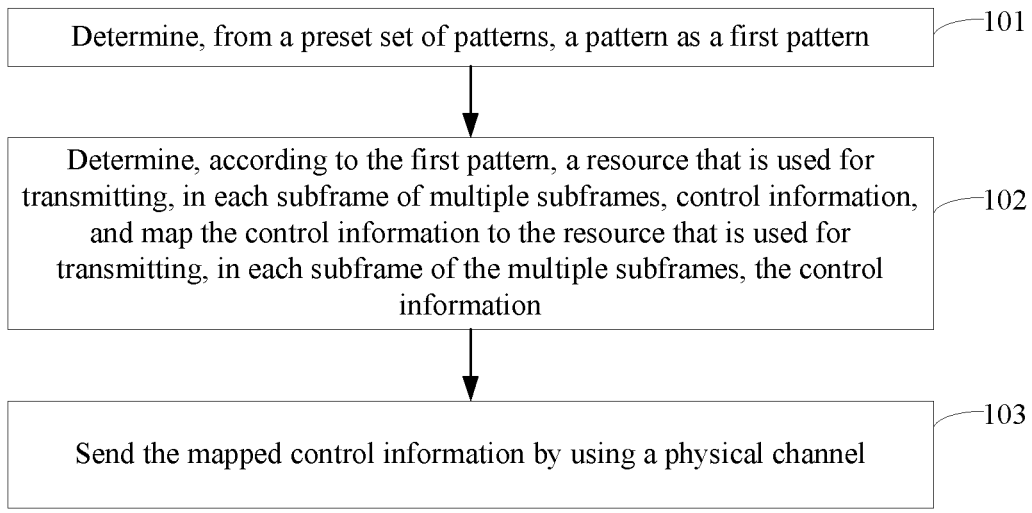
FIG. 1 is a flowchart of a control information sending method according to Embodiment 1 of the disclosure.

Referring to FIG. 1, this embodiment of the disclosure provides a control information sending method, including:

Step 101: Determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information.

The aggregation level indicates a quantity of control elements or a quantity of physical resource blocks that are used for transmitting the control information.

The resource indicator for the used resource is one or more of the following: a location indicator indicating a location, in all resources that can be provided by a single subframe, of a start resource in the used resource; a location indicator indicating a location, in all resources that are in a single subframe and that can be processed by user equipment, of a start resource in the used resource; a location indicator indicating a location, in all resources that are at an aggregation level in a single subframe and that can be processed by user equipment, of a start resource in the used resource; a location indicator indicating a location, in all resources that can be provided by a single subframe, of the used resource; a location indicator indicating a location, in all resources that are in a single subframe and that can be processed by user equipment, of the used resource; an index of a candidate physical control channel in all candidate physical control channels that are provided by search space corresponding to an aggregation level in a single subframe; an index, in all resources that can be provided by a single subframe, of the used resource; and an index, in all resources that are in a single subframe and that can be processed by user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

Step 102: Determine, according to the first pattern, a resource that is used for transmitting, in each subframe of the multiple subframes, the control information, and map the control information to the resource that is used for transmitting, in each subframe of the multiple subframes, the control information.

Step 103: Send the mapped control information by using a physical channel.

In this embodiment of the disclosure, a pattern is determined, from a preset set of patterns, as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information. A resource that is used for transmitting, in each subframe of the multiple subframes, the control information is determined according to the first pattern. The control information is mapped to the resource that is used for transmitting, in each subframe of the multiple subframes, the control information, and the mapped control information is sent by using a physical channel. In this way, the control information is mapped and transmitted in the multiple subframes, and reliability of control information transmission is improved.

Embodiment 2

Figure 2:
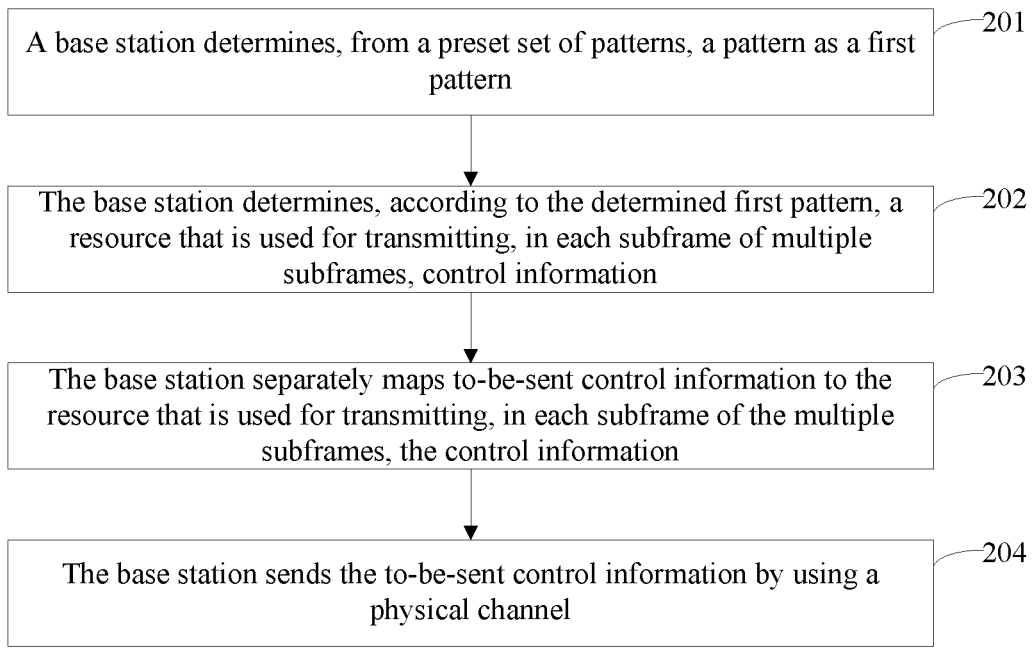
FIG. 2 is a flowchart of a control information sending method according to Embodiment 2 of the disclosure.

As shown in FIG. 2, this embodiment of the disclosure provides a control information sending method, where the method includes:

Step 201: A base station determines, from a preset set of patterns, a pattern as a first pattern.

The preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information.

The aggregation level indicates a quantity of control elements or a quantity of physical resource blocks that are used for transmitting the control information.

The resource indicator for the used resource is one or more of the following: a location indicator indicating a location, in all resources that can be provided by a single subframe, of a start resource in the used resource; a location indicator indicating a location, in all resources that are in a single subframe and that can be processed by user equipment, of a start resource in the used resource; a location indicator indicating a location, in all resources that are at an aggregation level in a single subframe and that can be processed by user equipment, of a start resource in the used resource; a location indicator indicating a location, in all resources that can be provided by a single subframe, of the used resource; a location indicator indicating a location, in all resources that are in a single subframe and that can be processed by user equipment, of the used resource; an index of a candidate physical control channel in all candidate physical control channels that are provided by search space corresponding to an aggregation level in a single subframe; an index, in all resources that can be provided by a single subframe, of the used resource; and an index, in all resources that are in a single subframe and that can be processed by user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

Preferably, the pattern further determines a control information format and/or power setting information that are/is used for transmitting, in each subframe of the multiple subframes, the control information.

A characteristic parameter of UE is determined, where each pattern of the preset set of patterns is corresponding to a characteristic parameter. A pattern corresponding to the characteristic parameter of the UE is determined, according to a correspondence between a characteristic parameter and a pattern, as the first pattern. The characteristic parameter may be: a path loss value or path loss range, a reference signal received power value or reference signal received power range, a reference signal received quality value or reference signal received quality range, a channel quality information value or channel quality information range, or a service type, a power saving requirement, a delay requirement, a quality of times a pre-specified channel is successfully detected, or a mobility requirement.

In this embodiment of the disclosure, this step may also be: determining a characteristic parameter of UE, determining, according to a correspondence between a characteristic parameter and an index of a pattern, an index of a pattern corresponding to the characteristic parameter of the UE, and determining, from a preset set of patterns according to the determined index of the pattern, a corresponding pattern as a first pattern.

The aggregation level is used to indicate a quantity of control elements or a quantity of physical resource blocks that are used for transmitting the control information. The aggregation level may be corresponding to search space, and the search space corresponding to the aggregation level may provide multiple resources.

The pattern included in the preset set of patterns is one or more patterns that are determined according to a control element, a channel variation characteristic, a coverage enhancement degree, and/or a scheduling characteristic that are available in each subframe. Alternatively, the pattern included in the preset set of patterns is a pattern pre-specified by a system.

For example, subframes used for transmitting the control information include four subframes, and it is assumed that the four subframes are subframes 1, 2, 3, and 4. The preset set of patterns includes the following four patterns: pattern 1, pattern 2, pattern 3, and pattern 4, and an aggregation level that is used for transmitting, in each subframe of the four subframes, the control information and a resource indicator for a resource that is used for transmitting, in each subframe of the four subframes, the control information are determined in each pattern. In this embodiment, the resource indicator for the used resource is an index of a control channel element set in all control channel element sets provided by search space corresponding to an aggregation level in a single subframe.

For pattern 1, the following are separately determined. Firstly, that an aggregation level used for transmitting, in the subframe 1, the control information is 4, and a control channel element set whose index in search space corresponding to the used aggregation level 4 is 0. Secondly, that an aggregation level used for transmitting, in the subframe 2, the control information is 4, and a control channel element set whose index in search space corresponding to the used aggregation level 4 is 0. Thirdly, that an aggregation level used for transmitting, in the subframe 3, the control information is 4, and a control channel element set whose index in search space corresponding to the used aggregation level 4 is 0. And fourthly, that an aggregation level used for transmitting, in the subframe 4, the control information is 4, and a control channel element set whose index in search space corresponding to the used aggregation level 4 is 0. Meanings indicated by the other patterns pattern 2, pattern 3, and pattern 4, can be similarly explained and described as that of the pattern 1, and are not be described in detail herein.

{Pattern 1: {(4, 0), (4, 0), (4, 0), (4, 0)}
Pattern 2: {(4, 0), (4, 0), (4, 1), (4, 1)}
Pattern 3: {(8, 0), (8, 0), (8, 0), (8, 0)}
Pattern 4: {(8, 0), (8, 0), (8, 1), (8, 1)}}

Preferably, the base station notifies the UE of the preset set of patterns by using radio resource control (RRC) broadcast signaling, RRC dedicated signaling, media access control element (MAC CE) signaling, or physical layer signaling.

In this embodiment, the base station may add a field to the RRC broadcast signaling, the RRC dedicated signaling, the MAC CE signaling, or the physical layer signaling, where the field is used to configure the preset set of patterns.

Correspondingly, the base station may send, to the UE, the RRC broadcast signaling, the RRC dedicated signaling, the MAC CE signaling, or the physical layer signaling, where the preset set of patterns is configured in the field added to the RRC broadcast signaling, the RRC dedicated signaling, the MAC CE signaling, or the physical layer signaling, so as to notify the UE of the preset set of patterns.

Preferably, the base station may add a field to a master information block (MIB) or a system information block (SIB) of the RRC broadcast signaling, where the field is used to configure the preset set of patterns.

Correspondingly, the base station may send the RRC broadcast signaling to the UE, where the preset set of patterns is configured in the field added to the MIB or the SIB of the RRC broadcast signaling, so as to notify the UE of the preset set of patterns.

In this embodiment, the base station may add an information element to the RRC broadcast signaling, the RRC dedicated signaling, the MAC CE signaling, or the physical layer signaling, where the information element is used to configure the preset set of patterns.

Correspondingly, the base station may send, to the UE, the RRC broadcast signaling, the RRC dedicated signaling, the MAC CE signaling, or the physical layer signaling, where the preset set of patterns is configured in the information element added to the RRC broadcast signaling, the RRC dedicated signaling, the MAC CE signaling, or the physical layer signaling, so as to notify the UE of the preset set of patterns.

Preferably, the base station may add an information element to an MIB or an SIB of the RRC broadcast signaling, where the information element is used to configure the preset set of patterns.

Correspondingly, the base station may send the RRC broadcast signaling to the UE, where the preset set of patterns is configured in the information element added to the MIB or the SIB of the RRC broadcast signaling, so as to notify the UE of the preset set of patterns.

Preferably, the base station determines a corresponding set of patterns for the UE, where the set of patterns corresponding to the UE is one or more patterns included in the preset set of patterns; and determines, from the set of patterns corresponding to the UE, a pattern as the first pattern.

Preferably, the base station notifies, by using RRC dedicated signaling, MAC CE signaling, or physical layer signaling, the UE of the set of patterns corresponding to the UE.

In this embodiment of the disclosure, the base station may add a field to the RRC dedicated signaling, the MAC CE signaling, or the physical layer signaling, where the field is used to configure the set of patterns corresponding to the UE.

Correspondingly, the base station may send, to the UE, the RRC broadcast signaling, the RRC dedicated signaling, the MAC CE signaling, or the physical layer signaling, where the set of patterns corresponding to the UE is configured in the field added to the RRC broadcast signaling, the RRC dedicated signaling, the MAC CE signaling, or the physical layer signaling, so as to notify the UE of the set of patterns corresponding to the UE.

Preferably, the base station may add a field to an MIB or an SIB of the RRC broadcast signaling, where the field is used to configure the set of patterns corresponding to the UE.

Correspondingly, the base station may send the RRC broadcast signaling to the UE, where the set of patterns corresponding to the UE is configured in the field added to the MIB or the SIB of the RRC broadcast signaling, so as to notify the UE of the set of patterns corresponding to the UE.

In this embodiment, the base station may add an information element to the RRC dedicated signaling, the MAC CE signaling, or the physical layer signaling, where the information element is used to configure the set of patterns corresponding to the UE.

Correspondingly, the base station may send, to the UE, the RRC dedicated signaling, the MAC CE signaling, or the physical layer signaling, where the set of patterns corresponding to the UE is configured in the information element added to the RRC broadcast signaling, the RRC dedicated signaling, the MAC CE signaling, or the physical layer signaling, so as to notify the UE of the set of patterns corresponding to the UE.

Preferably, the base station may add an information element to an MIB or an SIB of the RRC broadcast signaling, where the information element is used to configure the set of patterns corresponding to the UE.

Correspondingly, the base station may send the RRC broadcast signaling to the UE, where the set of patterns corresponding to the UE is configured in the information element added to the MIB or the SIB of the RRC broadcast signaling, so as to notify the UE of the set of patterns corresponding to the UE.

Preferably, the base station may further notify, by using RRC dedicated signaling, MAC CE signaling, or physical layer signaling, the UE of the determined first pattern.

In this embodiment, the base station may add a field to the RRC dedicated signaling, the MAC CE signaling, or the physical layer signaling, where the field is used to configure the determined first pattern.

Correspondingly, the base station may send, to the UE, the RRC dedicated signaling, the MAC CE signaling, or the physical layer signaling, where the determined first pattern is configured in the field added to the RRC broadcast signaling, the RRC dedicated signaling, the MAC CE signaling, or the physical layer signaling, so as to notify the UE of the determined first pattern.

Preferably, the base station may add a field to an MIB or an SIB of the RRC broadcast signaling, where the field is used to configure the determined first pattern.

Correspondingly, the base station may send the RRC broadcast signaling to the UE, where the determined first pattern is configured in the field added to the MIB or the SIB of the RRC broadcast signaling, so as to notify the UE of the determined first pattern.

In this embodiment, the base station may add an information element to the RRC dedicated signaling, the MAC CE signaling, or the physical layer signaling, where the information element is used to configure the determined first pattern.

Correspondingly, the base station may send, to the UE, the RRC dedicated signaling, the MAC CE signaling, or the physical layer signaling, where the determined first pattern is configured in the information element added to the RRC broadcast signaling, the RRC dedicated signaling, the MAC CE signaling, or the physical layer signaling, so as to notify the UE of the determined first pattern.

Preferably, the base station may add an information element to an MIB or an SIB of the RRC broadcast signaling, where the information element is used to configure the determined first pattern.

Correspondingly, the base station may send the RRC broadcast signaling to the UE, where the determined first pattern is configured in the information element added to the MIB or the SIB of the RRC broadcast signaling, so as to notify the UE of the determined first pattern.

Step 202: The base station determines, according to the determined first pattern, a resource that is used for transmitting, in each subframe of multiple subframes, control information.

Specifically, if the first pattern determines an aggregation level that is used for transmitting, in each subframe of the multiple subframes, the control information, the base station determines, according to the first pattern, the aggregation level that is used for transmitting, in each subframe of the multiple subframes, the control information, and determines, in search space corresponding to the aggregation level used in each subframe, the resource that is used for transmitting, in each subframe, the control information.

If the first pattern determines a resource indicator for a resource that is used for transmitting, in each subframe of the multiple subframes, the control information, the base station determines, from a preset supportable aggregation level, an aggregation level that is used for transmitting, in each subframe, the control information, and determines, according to the first pattern, separately in search space corresponding to the aggregation level used in each subframe, the resource that is used for transmitting, in each subframe, the control information.

If the first pattern determines an aggregation level that is used for transmitting, in each subframe of the multiple subframes, the control information, and the first pattern determines a resource indicator for a resource that is used for transmitting, in each subframe of the multiple subframes, the control information, the base station determines, according to the first pattern, the aggregation level and the resource indicator for the resource. The aggregation level and the resource are used for transmitting, in each subframe of the multiple subframes, the control information, and the base station determines, according to the resource indicator for the resource used in each subframe, separately in search space corresponding to the aggregation level used in each subframe, the resource that is used for transmitting, in each subframe, the control information.

Step 203: The base station separately maps to-be-sent control information to the resource that is used for transmitting, in each subframe of the multiple subframes, the control information.

A resource indicated by the determined resource indicator is the resource that is used for transmitting the control information. The resource includes one or more of a time resource, a frequency resource, a codeword resource, and a power resource, and a size of the resource is predetermined. More specifically, the resource may be: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands. The base station separately maps the to-be-sent control information to the resource that is used for transmitting, in each subframe, the control information.

Step 204: The base station sends the to-be-sent control information by using a physical channel.

In this embodiment, a pattern is determined, from a preset set of patterns, as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information. A resource that is used for transmitting, in each subframe of the multiple subframes, the control information is determined according to the first pattern. The control information is mapped to the resource that is used for transmitting, in each subframe of the multiple subframes, the control information, and the mapped control information is sent by using a physical channel. In this way, the control information is mapped and transmitted in the multiple subframes, and reliability of control information transmission is improved.

Embodiment 3

Figure 3:
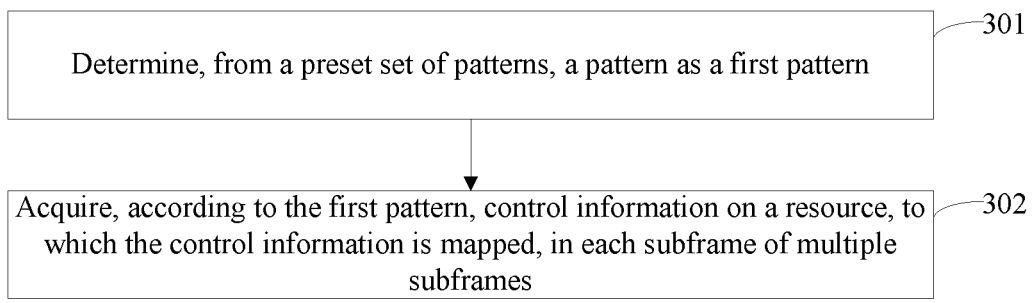
FIG. 3 is a flowchart of a control information receiving method according to Embodiment 3 of the disclosure.

Referring to FIG. 3, this embodiment of the disclosure provides a control information receiving method, including:

Step 301: Determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information.

The aggregation level indicates a quantity of control elements or a quantity of physical resource blocks that are used for transmitting the control information.

The resource indicator for the used resource is one or more of the following: a location indicator indicating a location, in all resources that can be provided by a single subframe, of a start resource in the used resource; a location indicator indicating a location, in all resources that are in a single subframe and that can be processed by user equipment, of a start resource in the used resource; a location indicator indicating a location, in all resources that are at an aggregation level in a single subframe and that can be processed by user equipment, of a start resource in the used resource; a location indicator indicating a location, in all resources that can be provided by a single subframe, of the used resource, a location indicator indicating a location, in all resources that are in a single subframe and that can be processed by user equipment, of the used resource; an index of a candidate physical control channel in all candidate physical control channels that are provided by search space corresponding to an aggregation level in a single subframe; an index, in all resources that can be provided by a single subframe, of the used resource; and an index, in all resources that are in a single subframe and that can be processed by user equipment, of the used resource.

The resource includes one or more of a time resource, a frequency resource, a codeword resource, and a power resource, and a size of the resource is predetermined. More specifically, the resource may be: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

Step 302: Acquire, according to the first pattern, the control information on a resource, to which the control information is mapped, in each subframe of the multiple subframes.

In this embodiment of the disclosure, a pattern is determined, from a preset set of patterns, as a first pattern, where the preset set of patterns includes one or more patterns. The pattern determines an aggregation level that is used for transmitting, in each subframe of multiple subframes, control information and/or determines a resource indicator for a resource that is used for transmitting, in each subframe of the multiple subframes, the control information. The control information is acquired, according to the first pattern, on a resource, to which the control information is mapped, in each subframe of the multiple subframes. In this way, the control information is mapped and transmitted in the multiple subframes, and reliability of control information transmission is improved.

Embodiment 4

Figure 4:
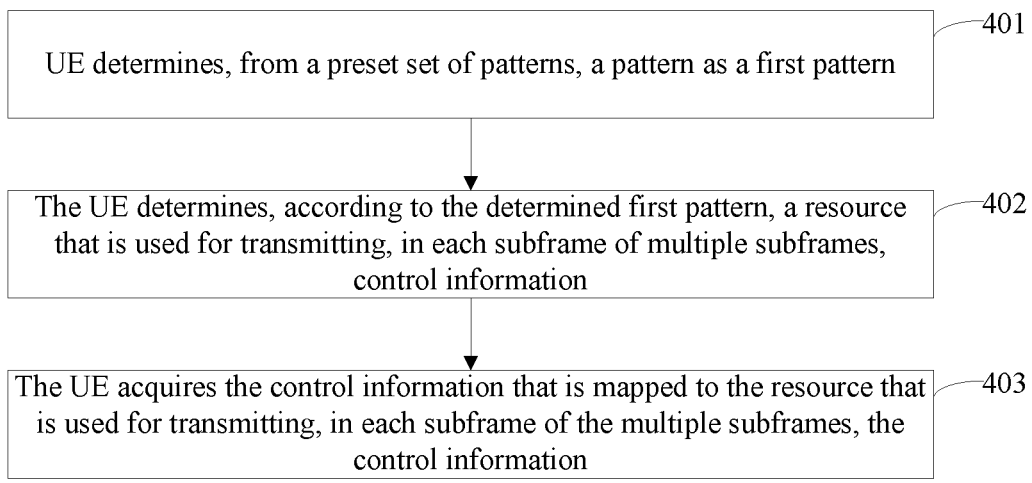
FIG. 4 is a flowchart of a control information receiving method according to Embodiment 4 of the disclosure.

Referring to FIG. 4, this embodiment of the disclosure provides a control information receiving method, including:

Step 401: UE determines, from a preset set of patterns, a pattern as a first pattern.

The preset set of patterns includes one or more patterns, and the pattern determines an aggregation level that is used for transmitting, in each subframe of multiple subframes, control information and/or determines a resource indicator for a resource that is used for transmitting, in each subframe of multiple subframes, the control information.

Each pattern of the preset set of patterns corresponds to a characteristic parameter. The UE determines a characteristic parameter of the UE and determines, according to a correspondence between a characteristic parameter and a pattern, a pattern corresponding to the characteristic parameter of the UE as the first pattern. The characteristic parameter may be: a path loss value or range, a reference signal received power value or range, a reference signal received quality value or range, a channel quality information value or range, a service type, a power saving requirement, a delay requirement, a quality of times a pre-specified channel is successfully detected, or a mobility requirement.

In this embodiment, this step may also be: determining, by UE, a characteristic parameter of the UE, determining, according to a correspondence between a characteristic parameter and an index of a pattern, an index of a pattern corresponding to the characteristic parameter of the UE, and determining, from a preset set of patterns according to the determined index of the pattern, a corresponding pattern as a first pattern.

Preferably, the pattern included in the preset set of patterns further determines a control information format and/or power setting information that are/is used for transmitting, in each subframe of the multiple subframes, the control information.

Further, before determining, from the preset set of patterns, a pattern as the first pattern, the UE acquires the preset set of patterns that is notified, by a base station, by using RRC broadcast signaling, RRC dedicated signaling, MAC CE signaling, or physical layer signaling.

In this embodiment, the base station notifies the UE of the preset set of patterns by using the RRC broadcast signaling, the RRC dedicated signaling, the MAC CE signaling, or the physical layer signaling.

Preferably, the base station adds a field to the RRC broadcast signaling, the RRC dedicated signaling, the MAC CE signaling, or the physical layer signaling, where the added field is used to configure the preset set of patterns.

Correspondingly, the base station may send, to the UE, the RRC broadcast signaling, the RRC dedicated signaling, the MAC CE signaling, or the physical layer signaling, where the preset set of patterns is configured in the field added to the RRC broadcast signaling, the RRC dedicated signaling, the MAC CE signaling, or the physical layer signaling.

The UE receives the RRC broadcast signaling, the RRC dedicated signaling, the MAC CE signaling, or the physical layer signaling that is sent by the base station, where the field is added, by the base station, to the RRC broadcast signaling, the RRC dedicated signaling, the MAC CE signaling, or the physical layer signaling, and the added field is used to configure the preset set of patterns; and determines the preset set of patterns according to the added field.

Preferably, the base station adds an information element to the RRC broadcast signaling, the RRC dedicated signaling, the MAC CE signaling, or the physical layer signaling, where the added information element is used to configure the preset set of patterns.

Correspondingly, the base station may send, to the UE, the RRC broadcast signaling, the RRC dedicated signaling, the MAC CE signaling, or the physical layer signaling, where the preset set of patterns is configured in the information element added to the RRC broadcast signaling, the RRC dedicated signaling, the MAC CE signaling, or the physical layer signaling.

The UE receives the RRC broadcast signaling, the RRC dedicated signaling, the MAC CE signaling, or the physical layer signaling that is sent by the base station, where the information element is added, by the base station, to the RRC broadcast signaling, the RRC dedicated signaling, the MAC CE signaling, or the physical layer signaling, and the added information element is used to configure the preset set of patterns; and determines the preset set of patterns according to the added information element.

In this embodiment, the UE may receive RRC dedicated signaling, MAC CE signaling, or physical layer signaling that is sent by a base station, where a field or an information element is added, by the base station, to the RRC dedicated signaling, the MAC CE signaling, or the physical layer signaling, the field or the information element is used to configure a set of patterns corresponding to the UE, and the set of patterns corresponding to the UE is one or more patterns included in the preset set of patterns; determine, according to the field or the information element, the set of patterns corresponding to the UE; and determine, from the set of patterns corresponding to the UE, a pattern as the first pattern.

In this embodiment, the base station may add a field to the RRC dedicated signaling, the MAC CE signaling, or the physical layer signaling, where the field is used to configure the set of patterns corresponding to the UE.

Correspondingly, the base station may send, to the UE, the RRC dedicated signaling, the MAC CE signaling, or the physical layer signaling, where the set of patterns corresponding to the UE is configured in the field added to the RRC broadcast signaling, the RRC dedicated signaling, the MAC CE signaling, or the physical layer signaling, so as to notify the UE of the set of patterns corresponding to the UE.

Preferably, the base station may add a field to an MIB or an SIB of the RRC broadcast signaling, where the field is used to configure the set of patterns corresponding to the UE.

Correspondingly, the base station may send the RRC broadcast signaling to the UE, where the set of patterns corresponding to the UE is configured in the field added to the MIB or the SIB of the RRC broadcast signaling, so as to notify the UE of the set of patterns corresponding to the UE.

In this embodiment, the base station may add an information element to the RRC dedicated signaling, the MAC CE signaling, or the physical layer signaling, where the information element is used to configure the set of patterns corresponding to the UE.

Correspondingly, the base station may send, to the UE, the RRC dedicated signaling, the MAC CE signaling, or the physical layer signaling, where the set of patterns corresponding to the UE is configured in the information element added to the RRC broadcast signaling, the RRC dedicated signaling, the MAC CE signaling, or the physical layer signaling, so as to notify the UE of the set of patterns corresponding to the UE.

Step 402: The UE determines, according to the determined first pattern, a resource that is used for transmitting, in each subframe of multiple subframes, control information.

If the first pattern determines an aggregation level that is used for transmitting, in each subframe of the multiple subframes, the control information, the UE determines, according to the first pattern, the aggregation level that is used for transmitting, in each subframe of the multiple subframes, the control information, and determines, in search space corresponding to the aggregation level used in each subframe, the resource that is used for transmitting, in each subframe, the control information.

If the first pattern determines a resource indicator for a resource that is used for transmitting, in each subframe of the multiple subframes, the control information, the UE determines, from a preset supportable aggregation level, an aggregation level that is used for transmitting, in each subframe, the control information, and determines, according to the first pattern, separately in search space corresponding to the aggregation level used in each subframe, the resource that is used for transmitting, in each subframe, the control information.

If the first pattern determines an aggregation level that is used for transmitting, in each subframe of the multiple subframes, the control information, and the first pattern determines a resource indicator for a resource that is used for transmitting, in each subframe of the multiple subframes, the control information, the UE determines, according to the first pattern, the aggregation level and the resource indicator for the resource, where the aggregation level and the resource are used for transmitting, in each subframe of the multiple subframes, the control information, and determines, according to the resource indicator for the resource used in each subframe, separately in search space corresponding to the aggregation level used in each subframe, the resource that is used for transmitting, in each subframe, the control information.

Step 403: The UE acquires the control information that is mapped to the resource that is used for transmitting, in each subframe of the multiple subframes, the control information.

A resource indicated by the determined resource indicator is the resource that is used for transmitting the control information. The resource includes one or more of a time resource, a frequency resource, a codeword resource, and a power resource, and a size of the resource is predetermined. More specifically, the resource may be: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands. The UE acquires the mapped control information on the resource that is used for transmitting, in each subframe of the multiple subframes, the control information.

In this embodiment, a pattern is determined, from a preset set of patterns, as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information. The control information is acquired, according to the first pattern, on a resource, to which the control information is mapped, in each subframe of the multiple subframes. In this way, the control information is mapped and transmitted in the multiple subframes, and reliability of control information transmission is improved.

Embodiment 5

Figure 5:
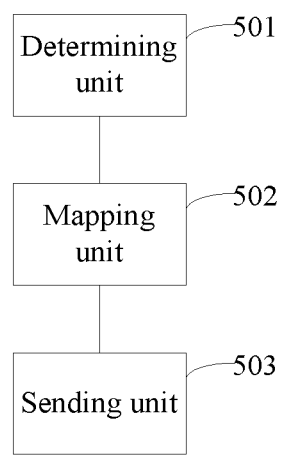
FIG. 5 is a schematic structural diagram of a base station according to Embodiment 5 of the disclosure.

Referring to FIG. 5, this embodiment of the disclosure provides a base station, including:

a determining unit 501, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information;

a mapping unit 502, configured to: determine, according to the first pattern determined by the determining unit 501, a resource that is used for transmitting, in each subframe of the multiple subframes, the control information, and map the control information to the resource that is used for transmitting, in each subframe of the multiple subframes, the control information; and a sending unit 503, configured to send, by using a physical channel, the control information mapped by the mapping unit 502.

The aggregation level indicates a quantity of control elements or a quantity of physical resource blocks that are used for transmitting the control information.

The resource indicator for the used resource is a location indicator indicating a location, in all resources that can be provided by a single subframe, of a start resource in the used resource, a location indicator indicating a location, in all resources that are in a single subframe and that can be processed by user equipment, of a start resource in the used resource, a location indicator indicating a location, in all resources that are at an aggregation level in a single subframe and that can be processed by user equipment, of a start resource in the used resource, a location indicator indicating a location, in all resources that can be provided by a single subframe, of the used resource, a location indicator indicating a location, in all resources that are in a single subframe and that can be processed by user equipment, of the used resource, an index of a candidate physical control channel in all candidate physical control channels that are provided by search space corresponding to an aggregation level in a single subframe, an index, in all resources that can be provided by a single subframe, of the used resource, or an index, in all resources that are in a single subframe and that can be processed by user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

Preferably, the mapping unit 502 is configured to: determine, according to the first pattern, an aggregation level that is used for transmitting, in each subframe of the multiple subframes, the control information, determine, in search space corresponding to the aggregation level used in each subframe, the resource that is used for transmitting, in each subframe, the control information, and map the control information to the resource that is used for transmitting, in each subframe, the control information; or the mapping unit 502 is configured to: determine, from a preset supportable aggregation level, an aggregation level that is used for transmitting, in each subframe, the control information, determine, according to the first pattern, separately in search space corresponding to the aggregation level used in each subframe, the resource that is used for transmitting, in each subframe, the control information, and map the control information to the resource that is used for transmitting, in each subframe, the control information; or the mapping unit 502 is configured to: determine, according to the first pattern, an aggregation level and a resource indicator for a resource, where the aggregation level and the resource are used for transmitting, in each subframe of the multiple subframes, the control information; determine, according to the resource indicator for the resource used in each subframe, separately in search space corresponding to the aggregation level used in each subframe, the resource that is used for transmitting, in each subframe, the control information; and map the control information to the resource that is used for transmitting, in each subframe, the control information.

Preferably, the pattern included in the preset set of patterns is one or more patterns that are determined according to a control element, a channel variation characteristic, a coverage enhancement degree, and/or a scheduling characteristic that are available in each subframe.

Preferably, the pattern included in the preset set of patterns is a pattern pre-specified by a system.

Preferably, the sending unit 503 is further configured to notify user equipment UE of the preset set of patterns by using radio resource control RRC broadcast signaling, RRC dedicated signaling, Media Access Control control element MAC CE signaling, or physical layer signaling.

Further, the base station further includes:
an adding unit, configured to add a field or an information element to the RRC broadcast signaling, the RRC dedicated signaling, the MAC CE signaling, or the physical layer signaling, where the field or the information element is used to configure the preset set of patterns.

The adding unit is configured to add a field or an information element to a master information block MIB or a system information block SIB of the RRC broadcast signaling, where the field or the information element is used to configure the preset set of patterns.

The determining unit 501 is configured to: determine a corresponding set of patterns for the UE, where the set of patterns corresponding to the UE is one or more patterns included in the preset set of patterns; and determine, from the set of patterns corresponding to the UE, a pattern as the first pattern.

Further, the base station further includes:
a notification unit, configured to notify, by using radio resource control RRC dedicated signaling, Media Access Control control element MAC CE signaling, or physical layer signaling, the UE of the set of patterns corresponding to the UE.

Further, the base station further includes:
an adding unit, configured to add a field or an information element to the RRC dedicated signaling, the MAC CE signaling, or the physical layer signaling, where the field or the information element is used to configure the set of patterns corresponding to the UE.

The notification unit is configured to notify, by using the RRC dedicated signaling, the MAC CE signaling, or the physical layer signaling, the UE of an index, in the preset set of patterns, of the pattern included in the set of patterns corresponding to the UE, so that the UE determines, from the preset set of patterns according to the index, in the preset set of patterns, of the pattern included in the set of patterns corresponding to the UE, the set of patterns corresponding to the UE.

The adding unit is configured to add a field or an information element to the RRC dedicated signaling, the MAC CE signaling, or the physical layer signaling, where the field or the information element is used to configure the index, in the preset set of patterns, of the pattern included in the set of patterns corresponding to the UE.

The determining unit 501 is configured to: determine a characteristic parameter of user equipment, where each pattern of the preset set of patterns is corresponding to a characteristic parameter; and determine, according to a correspondence between a characteristic parameter and a pattern, a pattern corresponding to the characteristic parameter of the user equipment as the first pattern, where the characteristic parameter is: a path loss value or path loss range, or a reference signal received power value or reference signal received power range, or a reference signal received quality value or reference signal received quality range, or a channel quality information value or channel quality information range, or a service type, or a power saving requirement, or a delay requirement, or a quality of times a pre-specified channel is successfully detected, or a mobility requirement.

The pattern further determines a control information format and/or a power setting that are/is used for transmitting, in each subframe of the multiple subframes, the control information.

The UE is notified, by using RRC dedicated signaling, MAC CE signaling, or physical layer signaling, of the determined first pattern.

In this embodiment, a pattern is determined, from a preset set of patterns, as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information. A resource that is used for transmitting, in each subframe of the multiple subframes, the control information is determined according to the first pattern. The control information is mapped to the resource that is used for transmitting, in each subframe of the multiple subframes, the control information, and the mapped control information is sent by using a physical channel. In this way, the control information is mapped and transmitted in the multiple subframes, and reliability of control information transmission is improved.

Embodiment 6

Figure 6:
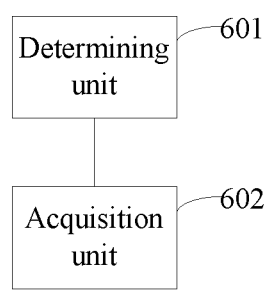
FIG. 6 is a schematic structural diagram of UE according to Embodiment 6 of the disclosure.

Referring to FIG. 6, this embodiment of the disclosure provides user equipment UE, including:
- a determining unit 601, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information; and
- an acquisition unit 602, configured to acquire, according to the first pattern determined by the determining unit 601, the control information on a resource, to which the control information is mapped, in each subframe of the multiple subframes.

The aggregation level indicates a quantity of control elements or a quantity of physical resource blocks that are used for transmitting the control information.

The resource indicator for the used resource is a location indicator indicating a location, in all resources that can be provided by a single subframe, of a start resource in the used resource, a location indicator indicating a location, in all resources that are in a single subframe and that can be processed by the user equipment, of a start resource in the used resource, a location indicator indicating a location, in all resources that are at an aggregation level in a single subframe and that can be processed by the user equipment, of a start resource in the used resource, a location indicator indicating a location, in all resources that can be provided by a single subframe, of the used resource, a location indicator indicating a location, in all resources that are in a single subframe and that can be processed by the user equipment, of the used resource, an index of a candidate physical control channel in all candidate physical control channels that are provided by search space corresponding to an aggregation level in a single subframe, an index, in all resources that can be provided by a single subframe, of the used resource, or an index, in all resources that are in a single subframe and that can be processed by the user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

Preferably, the acquisition unit 602 is configured to: determine, according to the first pattern, an aggregation level that is used for transmitting, in each subframe of the multiple subframes, the control information, determine, in search space corresponding to the aggregation level used in each subframe, a resource that is used for transmitting, in each subframe, the control information, and acquire the control information on the resource that is used for transmitting, in each subframe, the control information; or the acquisition unit 602 is configured to: determine, from a preset supportable aggregation level, an aggregation level that is used for transmitting, in each subframe, the control information, determine, according to the first pattern, separately in search space corresponding to the aggregation level used in each subframe, a resource that is used for transmitting, in each subframe, the control information, and acquire the control information on the resource that is used for transmitting, in each subframe, the control information; or the acquisition unit 602 is configured to: determine, according to the first pattern, an aggregation level and a resource indicator for a resource, where the aggregation level and the resource are used for transmitting, in each subframe of multiple subframes, the control information; determine, according to the resource indicator for the resource used in each subframe, separately in search space corresponding to the aggregation level used in each subframe, a resource that is used for transmitting, in each subframe, the control information, and acquire the control information on the resource that is used for transmitting, in each subframe, the control information.

The pattern included in the preset set of patterns is a pattern pre-specified by a system.

Preferably, the UE further includes:
a receiving unit, configured to receive radio resource control RRC broadcast signaling, RRC dedicated signaling, Media Access Control control element MAC CE signaling, or physical layer signaling that is sent by a base station, where a field or an information element is added, by the base station, to the RRC broadcast signaling, the RRC dedicated signaling, the MAC CE signaling, or the physical layer signaling, and the field or the information element is used to configure the preset set of patterns; and determine the preset set of patterns according to the field or the information element.

A field or an information element is added, by the base station, to a master information block MIB or a system information block SIB of the RRC broadcast signaling, where the field or the information element is used to configure the preset set of patterns.

The determining unit 601 is configured to: receive radio resource control RRC dedicated signaling, Media Access Control control element MAC CE signaling, or physical layer signaling that is sent by a base station, where a field or an information element is added, by the base station, to the RRC dedicated signaling, the MAC CE signaling, or the physical layer signaling, the field or the information element is used to configure a set of patterns corresponding to the user equipment UE, and the set of patterns corresponding to the UE is one or more patterns included in the preset set of patterns; determine, according to the field or the information element, the set of patterns corresponding to the UE, and determine, from the set of patterns corresponding to the UE, a pattern as the first pattern.

The determining unit 601 is configured to receive radio resource control RRC dedicated signaling, Media Access Control control element MAC CE signaling, or physical layer signaling that is sent by a base station, where a field or an information element is added, by the base station, to the RRC dedicated signaling, the MAC CE signaling, or the physical layer signaling, and the field or the information element is used to configure an index, in the preset set of patterns, of a pattern included in a set of patterns corresponding to the user equipment UE; and determine, from the preset set of patterns according to the index, which is in the preset set of patterns and configured in the field or the information element, of the pattern included in the set of patterns corresponding to the UE, the set of patterns corresponding to the UE, and determine, from the set of patterns corresponding to the UE, a pattern as the first pattern.

The determining unit 601 is configured to: determine a characteristic parameter of the user equipment, where each pattern of the preset set of patterns is corresponding to a characteristic parameter; and determine, according to a correspondence between a characteristic parameter and a pattern, a pattern corresponding to the characteristic parameter of the user equipment as the first pattern, where the characteristic parameter is: a path loss value or range, or a reference signal received power value or range, or a reference signal received quality value or range, or a channel quality information value or range, or a service type, or a power saving requirement, or a delay requirement, or a quality of times a pre-specified channel is successfully detected, or a mobility requirement.

The pattern determines a control information format and/or power setting information that are/is used for transmitting, in each subframe of the multiple subframes, the control information.

The determining unit 601 is configured to: receive signaling sent by a base station, where the signaling includes a configuration for the first pattern, and the signaling is RRC dedicated signaling, MAC CE signaling, or physical layer signaling; and determine the first pattern according to the configuration for the first pattern.

In this embodiment, a pattern is determined, from a preset set of patterns, as a first pattern, where the preset set of patterns includes one or more patterns. And the pattern determines an aggregation level that is used for transmitting, in each subframe of multiple subframes, control information and/or determines a resource indicator for a resource that is used for transmitting, in each subframe of the multiple subframes, the control information. The control information is acquired, according to the first pattern, on a resource, to which the control information is mapped, in each subframe of the multiple subframes. In this way, the control information is mapped and transmitted in the multiple subframes, and reliability of control information transmission is improved.

Embodiment 7

Figure 7:
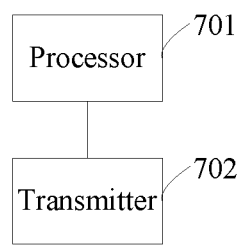
FIG. 7 is a schematic structural diagram of a base station according to Embodiment 7 of the disclosure.

Referring to FIG. 7, this embodiment of the disclosure provides a base station, including:
a processor 701, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information, where
the processor 701 is further configured to: determine, according to the first pattern, a resource that is used for transmitting, in each subframe of the multiple subframes, the control information, and map the control information to the resource that is used for transmitting, in each subframe of the multiple subframes, the control information; and
a transmitter 702, configured to send, by using a physical channel, the control information mapped by the processor 701.

The aggregation level indicates a quantity of control elements or a quantity of physical resource blocks that are used for transmitting the control information.

The resource indicator for the used resource is a location indicator indicating a location, in all resources that can be provided by a single subframe, of a start resource in the used resource, a location indicator indicating a location, in all resources that are in a single subframe and that can be processed by user equipment, of a start resource in the used resource, a location indicator indicating a location, in all resources that are at an aggregation level in a single subframe and that can be processed by user equipment, of a start resource in the used resource, a location indicator indicating a location, in all resources that can be provided by a single subframe, of the used resource, a location indicator indicating a location, in all resources that are in a single subframe and that can be processed by user equipment, of the used resource, an index of a candidate physical control channel in all candidate physical control channels that are provided by search space corresponding to an aggregation level in a single subframe, an index, in all resources that can be provided by a single subframe, of the used resource, or an index, in all resources that are in a single subframe and that can be processed by user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

The processor 701 is configured to: determine, according to the first pattern, an aggregation level that is used for transmitting, in each subframe of the multiple subframes, the control information, determine, in search space corresponding to the aggregation level used in each subframe, the resource that is used for transmitting, in each subframe, the control information, and map the control information to the resource that is used for transmitting, in each subframe, the control information; or the processor 701 is configured to: determine, from a preset supportable aggregation level, an aggregation level that is used for transmitting, in each subframe, the control information, determine, according to the first pattern, separately in search space corresponding to the aggregation level used in each subframe, the resource that is used for transmitting, in each subframe, the control information, and map the control information to the resource that is used for transmitting, in each subframe, the control information; or the processor 701 is configured to: determine, according to the first pattern, an aggregation level and a resource indicator for a resource, where the aggregation level and the resource are used for transmitting, in each subframe of the multiple subframes, the control information; determine, according to the resource indicator for the resource used in each subframe, separately in search space corresponding to the aggregation level used in each subframe, the resource that is used for transmitting, in each subframe, the control information; and map the control information to the resource that is used for transmitting, in each subframe, the control information.

The pattern included in the preset set of patterns is one or more patterns that are determined according to a control element, a channel variation characteristic, a coverage enhancement degree, and/or a scheduling characteristic that are available in each subframe.

The pattern included in the preset set of patterns is a pattern pre-specified by a system.

The transmitter 702 is further configured to notify user equipment UE of the preset set of patterns by using radio resource control RRC broadcast signaling, RRC dedicated signaling, Media Access Control control element MAC CE signaling, or physical layer signaling.

The processor 701 is further configured to add a field or an information element to the RRC broadcast signaling, the RRC dedicated signaling, the MAC CE signaling, or the physical layer signaling, where the field or the information element is used to configure the preset set of patterns.

The processor 701 is further configured to add a field or an information element to a master information block MIB or a system information block SIB of the RRC broadcast signaling, where the field or the information element is used to configure the preset set of patterns.

The processor 701 is configured to: determine a corresponding set of patterns for the UE, where the set of patterns corresponding to the UE is one or more patterns included in the preset set of patterns; and determine, from the set of patterns corresponding to the UE, a pattern as the first pattern.

The transmitter 702 is further configured to notify, by using radio resource control RRC dedicated signaling, Media Access Control control element MAC CE signaling, or physical layer signaling, the UE of the set of patterns corresponding to the UE.

The processor 701 is further configured to add a field or an information element to the RRC dedicated signaling, the MAC CE signaling, or the physical layer signaling, where the field or the information element is used to configure the set of patterns corresponding to the UE.

The transmitter 702 is further configured to notify, by using the RRC dedicated signaling, the MAC CE signaling, or the physical layer signaling, the UE of an index, in the preset set of patterns, of the pattern included in the set of patterns corresponding to the UE, so that the UE determines, from the preset set of patterns according to the index, in the preset set of patterns, of the pattern included in the set of patterns corresponding to the UE, the set of patterns corresponding to the UE.

The processor 701 is further configured to add a field or an information element to the RRC dedicated signaling, the MAC CE signaling, or the physical layer signaling, where the field or the information element is used to configure the index, in the preset set of patterns, of the pattern included in the set of patterns corresponding to the UE.

The processor 701 is further configured to: determine a characteristic parameter of user equipment, where a pattern included in the preset set of patterns is corresponding to a characteristic parameter; and determine, according to a correspondence between a characteristic parameter and a pattern, a pattern corresponding to the characteristic parameter of the user equipment as the first pattern, where the characteristic parameter is: a path loss value or path loss range, or a reference signal received power value or reference signal received power range, or a reference signal received quality value or reference signal received quality range, or a channel quality information value or channel quality information range, or a service type, or a power saving requirement, or a delay requirement, or a quality of times a pre-specified channel is successfully detected, or a mobility requirement.

The pattern further determines a control information format and/or a power setting that are/is used for transmitting, in each subframe of the multiple subframes, the control information.

The UE is notified, by using RRC dedicated signaling, MAC CE signaling, or physical layer signaling, of the determined first pattern.

In this embodiment, a pattern is determined, from a preset set of patterns, as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information. A resource that is used for transmitting, in each subframe of the multiple subframes, the control information is determined according to the first pattern. The control information is mapped to the resource that is used for transmitting, in each subframe of the multiple subframes, the control information, and the mapped control information is sent by using a physical channel. In this way, the control information is mapped and transmitted in the multiple subframes, and reliability of control information transmission is improved.

Embodiment 8

Figure 8:
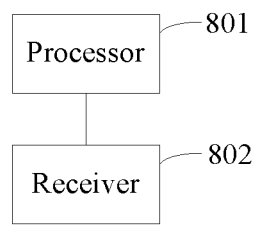
FIG. 8 is a schematic structural diagram of UE according to Embodiment 8 of the disclosure.

Referring to FIG. 8, this embodiment of the disclosure provides user equipment UE, including:
  a processor 801, configured to determine, from a preset set of patterns, a pattern as a first pattern, where the preset set of patterns includes one or more patterns, and the pattern determines an aggregation level that is used for transmitting, in each subframe of multiple subframes, control information and/or determines a resource indicator for a resource that is used for transmitting, in each subframe of the multiple subframes, the control information, where
  the processor 801 is further configured to acquire, according to the first pattern, the control information on a resource, to which the control information is mapped, in each subframe of the multiple subframes.

The aggregation level indicates a quantity of control elements or a quantity of physical resource blocks that are used for transmitting the control information.

The resource indicator for the used resource is a location indicator indicating a location, in all resources that can be provided by a single subframe, of a start resource in the used resource, a location indicator indicating a location, in all resources that are in a single subframe and that can be processed by the user equipment, of a start resource in the used resource, a location indicator indicating a location, in all resources that are at an aggregation level in a single subframe and that can be processed by the user equipment, of a start resource in the used resource, a location indicator indicating a location, in all resources that can be provided by a single subframe, of the used resource, a location indicator indicating a location, in all resources that are in a single subframe and that can be processed by the user equipment, of the used resource, an index of a candidate physical control channel in all candidate physical control channels that are provided by search space corresponding to an aggregation level in a single subframe, an index, in all resources that can be provided by a single subframe, of the used resource, or an index, in all resources that are in a single subframe and that can be processed by the user equipment, of the used resource.

The resource includes one or more of a time resource, a frequency resource, a codeword resource, and a power resource, and a size of the resource is predetermined. More specifically, the resource is: one control channel element, a control channel element set composed of multiple control channel elements, one enhanced control channel element, an enhanced control channel element set composed of multiple enhanced control channel elements, one physical resource block, multiple physical resource blocks, one resource element, multiple resource elements, one sub-band, or multiple sub-bands.

The processor 801 is configured to: determine, according to the first pattern, an aggregation level that is used for transmitting, in each subframe of the multiple subframes, the control information, determine, in search space corresponding to the aggregation level used in each subframe, a resource that is used for transmitting, in each subframe, the control information, and acquire the control information on the resource that is used for transmitting, in each subframe, the control information; or
  the processor 801 is configured to: determine, from a preset supportable aggregation level, an aggregation level that is used for transmitting, in each subframe, the control information, determine, according to the first pattern, separately in search space corresponding to the aggregation level used in each subframe, a resource that is used for transmitting, in each subframe, the control information, and acquire the control information on the resource that is used for transmitting, in each subframe, the control information; or
  the processor 801 is configured to: determine, according to the first pattern, an aggregation level and a resource indicator for a resource, where the aggregation level and the resource are used for transmitting, in each subframe of multiple subframes, the control information; determine, according to the resource indicator for the resource used in each subframe, separately in search space corresponding to the aggregation level used in each subframe, a resource that is used for transmitting, in each subframe, the control information, and acquire the control information on the resource that is used for transmitting, in each subframe, the control information.

The pattern included in the preset set of patterns is a pattern pre-specified by a system.

The UE further includes:
  a receiver 802, configured to receive radio resource control RRC broadcast signaling, RRC dedicated signaling, Media Access Control control element MAC CE signaling, or physical layer signaling that is sent by a base station, where a field or an information element is added, by the base station, to the RRC broadcast signaling, the RRC dedicated signaling, the MAC CE signaling, or the physical layer signaling, and the field or the information element is used to configure the preset set of patterns; and determine the preset set of patterns according to the field or the information element.

A field or an information element is added, by the base station, to a master information block MIB or a system information block SIB of the RRC broadcast signaling, where the field or the information element is used to configure the preset set of patterns.

The processor 801 is configured to: receive radio resource control RRC dedicated signaling, Media Access Control control element MAC CE signaling, or physical layer signaling that is sent by a base station, where a field or an information element is added, by the base station, to the RRC dedicated signaling, the MAC CE signaling, or the physical layer signaling, the field or the information element is used to configure a set of patterns corresponding to the user equipment UE, and the set of patterns corresponding to the UE is one or more patterns included in the preset set of patterns; determine, according to the field or the information element, the set of patterns corresponding to the UE, and determine, from the set of patterns corresponding to the UE, a pattern as the first pattern.

The processor 801 is configured to receive radio resource control RRC dedicated signaling, Media Access Control control element MAC CE signaling, or physical layer signaling that is sent by a base station, where a field or an information element is added, by the base station, to the RRC dedicated signaling, the MAC CE signaling, or the physical layer signaling, and the field or the information element is used to configure an index, in the preset set of patterns, of a pattern included in a set of patterns corresponding to the user equipment UE; and determine, from the preset set of patterns according to the index, which is in the preset set of patterns and configured in the field or the information element, of the pattern included in the set of patterns corresponding to the UE, the set of patterns corresponding to the UE, and determine, from the set of patterns corresponding to the UE, a pattern as the first pattern.

The processor 801 is configured to: determine a characteristic parameter of the user equipment, where a pattern included in the preset set of patterns is corresponding to a characteristic parameter; and determine, according to a correspondence between a characteristic parameter and a pattern, a pattern corresponding to the characteristic parameter of the user equipment as the first pattern, where the characteristic parameter is: a path loss value or range, or a reference signal received power value or range, or a reference signal received quality value or range, or a channel quality information value or range, or a service type, or a power saving requirement, or a delay requirement, or a quality of times a pre-specified channel is successfully detected, or a mobility requirement.

The pattern determines a control information format and/or power setting information that are/is used for transmitting, in each subframe of the multiple subframes, the control information.

The processor 801 is configured to: receive signaling sent by a base station, where the signaling includes a configuration for the first pattern, and the signaling is RRC dedicated signaling, MAC CE signaling, or physical layer signaling; and determine the first pattern according to the configuration for the first pattern.

In this embodiment, a pattern is determined, from a preset set of patterns, as a first pattern, where the preset set of patterns includes one or more patterns. And the pattern determines an aggregation level that is used for transmitting, in each subframe of multiple subframes, control information and/or determines a resource indicator for a resource that is used for transmitting, in each subframe of the multiple subframes, the control information. The control information is acquired, according to the first pattern, on a resource, to which the control information is mapped, in each subframe of the multiple subframes. In this way, the control information is mapped and transmitted in the multiple subframes, and reliability of control information transmission is improved.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A control information receiving method, comprising:
 determining, by a user equipment, a first pattern corresponding to a characteristic parameter of the user equipment from a preset set of patterns, the first pattern corresponding to one or both of an aggregation level for control information in each subframe of multiple subframes or a resource indicator for a resource that is used for the control information in each subframe of the multiple subframes, each pattern of the preset set of patterns being associated with a corresponding characteristic parameter, the characteristic parameter of the user equipment comprising at least one of a reference signal received power range or a reference signal received power value; and
 acquiring, by the user equipment, the control information mapped on the resource in each subframe of the multiple subframes according to the first pattern.

2. The method according to claim 1, wherein the pattern corresponds to a control information format used for transmitting the control information in each subframe of the multiple subframes.

3. The method according to claim 1, wherein the preset set of patterns comprises at least one of:
 pattern 1: {(4,0), (4,0), (4,0), (4,0)}; or
 pattern 2: {(8,0), (8,0), (8,0), (8,0)}; wherein
 pattern 1 indicates that in each subframe, an aggregation level used for transmitting control information is 4, and a control channel element set whose index in search space associated with the aggregation level 4 is 0;
 pattern 2 indicates that in each subframe, an aggregation level used for transmitting control information is 8, and a control channel element set whose index in search space associated with the aggregation level 8 is 0.

4. The method according to claim 1, the method further comprising:
 receiving, by the user equipment from a base station, radio resource control (RRC) broadcast signaling or RRC dedicated signaling, the RRC broadcast signaling or the RRC dedicated signaling including a field or an information element; and
 determining, by the user equipment, the preset set of patterns according to the field or the information element.

5. A control information sending method comprising:
 determining, by a network device, a first pattern corresponding to a characteristic parameter of a user equipment from a preset set of patterns, the first pattern corresponding to one or both of an aggregation level for control information in each subframe of multiple subframes or a resource indicator for a resource that is used for the control information in each subframe of the multiple subframes, each pattern of the preset set of patterns being associated with a corresponding characteristic parameter, the characteristic parameter of the user equipment comprising at least one of a reference signal received power range or a reference signal received power value;
 determining, by the network device, the resource according to the first pattern;
 sending, by the network device, the control information mapped to the resource, the sending using a physical channel.

6. The method according to claim 5, wherein the pattern corresponds to a control information format used for transmitting the control information in each subframe of the multiple subframes.

7. The method according to claim 5, wherein the preset set of patterns comprises at least one of:
 pattern 1: {(4,0), (4,0), (4,0), (4,0)}; or
 pattern 2: {(8,0), (8,0), (8,0), (8,0)}; wherein pattern 1 indicates that in each subframe, an aggregation level used for transmitting control information is 4, and a control channel element set whose index in search space associated with the aggregation level 4 is 0; and pattern 2 indicates that in each subframe, an aggregation level used for transmitting control information is 8, and a control channel element set whose index in search space associated with the aggregation level 8 is 0.

8. The method according to claim 5, further comprising: sending, by the network device, to the user equipment, radio resource control (RRC) broadcast signaling or RRC dedicated signaling, the RRC broadcast signaling or the RRC dedicated signaling including a field or an information element, the field or the information element indicating the preset set of patterns.

9. An apparatus, comprising:

a storage medium configured to store program instructions; and one or more processors in communication with the storage medium, the one or more processors execute the program instructions to perform operations comprising:

determining a first pattern corresponding to a characteristic parameter of a user equipment from a preset set of patterns, the first pattern corresponding to one or both of an aggregation level for control information in each subframe of multiple subframes or a resource indicator for a resource that is used for the control information in each subframe of the multiple subframes, each pattern of the preset set of patterns being associated with a corresponding characteristic parameter, the characteristic parameter of the user equipment comprising at least one of a reference signal received power range or a reference signal received power value; and acquiring the control information mapped on the resource in each subframe of the multiple subframes according to the first pattern.

10. The apparatus according to claim 9, wherein the pattern corresponds to a control information format used for transmitting the control information in each subframe of the multiple subframes.

11. The apparatus according to claim 9, wherein the preset set of patterns comprises at least one of:

pattern 1: {(4,0), (4,0), (4,0), (4,0)}; or pattern 2: {(8,0), (8,0), (8,0), (8,0)}; wherein pattern 1 indicates that in each subframe, an aggregation level used for transmitting control information is 4, and a control channel element set whose index in search space associated with the aggregation level 4 is 0;

pattern 2 indicates that in each subframe, an aggregation level used for transmitting control information is 8, and a control channel element set whose index in search space associated with the aggregation level 8 is 0.

12. The apparatus according to claim 9, wherein the operations further comprise:

receiving radio resource control (RRC) broadcast signaling or RRC dedicated signaling from a base station, the RRC broadcast signaling or RRC dedicated signaling including a field or an information element; and determining the preset set of patterns according to the field or the information element.

13. An apparatus, comprising:

a storage medium configured to store program instructions; and one or more processors in communication with the storage medium, the one or more processors execute the program instructions to perform operations comprising:

determining a first pattern corresponding to a characteristic parameter of user equipment from a preset set of patterns, the first pattern corresponding to one or both of an aggregation level for control information in each subframe of multiple subframes or a resource indicator for a resource that is for the control information in each subframe of the multiple subframes, each pattern of the preset set of patterns being associated with a corresponding characteristic parameter, the characteristic parameter of the user equipment comprising at least one of a reference signal received power range or a reference signal received power value;

determining the resource according to the first pattern; and sending the control information mapped to the resource, using a physical channel.

14. The apparatus according to claim 13, wherein the pattern corresponds to a control information format that is used for transmitting the control information in each subframe of the multiple subframes.

15. The apparatus according to claim 13, wherein the preset set of patterns comprises at least one of:

pattern 1: {(4,0), (4,0), (4,0), (4,0)}; or pattern 2: {(8,0), (8,0), (8,0), (8,0)}; wherein pattern 1 indicates that in each subframe, an aggregation level used for transmitting control information is 4, and a control channel element set whose index in search space associated with the aggregation level 4 is 0; and pattern 2 indicates that in each subframe, an aggregation level used for transmitting control information is 8, and a control channel element set whose index in search space associated with the aggregation level 8 is 0.

16. The apparatus according to claim 13, wherein the operations further comprises:

sending to a user equipment, radio resource control (RRC) broadcast signaling or RRC dedicated signaling, the RRC broadcast signaling or the RRC dedicated signaling including a field or an information element, the field or the information element indicating the preset set of patterns.

* * * * *